(12) United States Patent
Jakovljevic

(10) Patent No.: US 6,615,955 B2
(45) Date of Patent: Sep. 9, 2003

(54) HYDRAULIC BRAKES FOR BICYCLE

(76) Inventor: Petar Jakovljevic, 16-2601 Matheson Blvd. E., Ontario (CA), L4W 5A8

( * ) Notice: Subject to any disclaimer, the term of this patent is extended or adjusted under 35 U.S.C. 154(b) by 0 days.

(21) Appl. No.: 09/879,582

(22) Filed: Jun. 12, 2001

(65) Prior Publication Data

US 2002/0185349 A1 Dec. 12, 2002

(51) Int. Cl.$^7$ .................................................. B62L 1/06
(52) U.S. Cl. ..................................... 188/24.14; 188/344
(58) Field of Search ........................... 188/24.11, 24.12, 188/24.14, 24.16, 24.22, 344, 346, 355, 358, 359

(56) References Cited

U.S. PATENT DOCUMENTS

| | | | |
|---|---|---|---|
| 536,261 A | * 3/1895 | Booth | 188/344 |
| 610,796 A | 9/1898 | Bowman | |
| 3,700,075 A | * 10/1972 | Mortimer et al. | 188/346 |
| 3,921,764 A | * 11/1975 | Mathauser | 188/344 |
| 3,993,174 A | 11/1976 | Williams et al. | 188/344 |
| 4,102,439 A | 7/1978 | Calderazzo | 188/24 |
| 4,605,595 A | * 8/1986 | Tsang et al. | 188/251 R |
| 4,615,415 A | * 10/1986 | Mathauser | 188/24.22 |
| 4,625,985 A | * 12/1986 | Nakano et al. | 188/346 |
| 4,665,803 A | 5/1987 | Mathauser | 92/99 |
| 4,703,839 A | * 11/1987 | Nokano et al. | 188/346 |
| 5,390,771 A | 2/1995 | Hinkens et al. | 188/344 |
| 5,464,239 A | 11/1995 | Gajek et al. | 280/264 |
| 5,564,534 A | * 10/1996 | Toyoda et al. | 188/345 |
| 5,632,362 A | 5/1997 | Leitner | 188/344 |
| 5,758,928 A | * 6/1998 | Kobayashi et al. | 188/346 |
| 5,950,772 A | 9/1999 | Buckley et al. | 188/26 |
| 6,382,374 B1 | * 5/2002 | Iwai et al. | 188/24.14 |

FOREIGN PATENT DOCUMENTS

| | | | |
|---|---|---|---|
| GB | 10321 | * of 1900 | 188/344 |
| GB | 16581 | * of 1984 | 188/344 |

* cited by examiner

Primary Examiner—Jack Lavinder
Assistant Examiner—Thomas J. Williams
(74) Attorney, Agent, or Firm—Gifford, Krass, Groh, Sprinkle, Anderson & Citkowski, P.C.

(57) ABSTRACT

A hydraulic brake system for a bicycle having a frame, a handlebar, and front and rear wheels, includes a master hydraulic cylinder mountable on the handlebar and a handle mechanism operatively connected to the master hydraulic cylinder in order to actuate same. A first hydraulic cylinder actuator is mountable on the frame adjacent the rear wheel and is operatively connected to the master hydraulic cylinder. A rear wheel brake pad is connected to the hydraulic cylinder actuator and is operable thereby. There is a second hydraulic cylinder actuator mountable on the frame adjacent the rear wheel and connected to the rear wheel brake pad. A third hydraulic cylinder actuator is mountable on the frame adjacent the front wheel and is operatively connected to the second hydraulic cylinder actuator so as to be operable by the latter and a front wheel braking device is connected to the third actuator. This braking device brakes the front wheel when the rear wheel braking device is in its braking position.

23 Claims, 6 Drawing Sheets

HYDRAULIC BRAKES FOR BICYCLE

BACKGROUND OF THE INVENTION

This invention relates to brake systems for bicycles and in particular to such brakes which are operated hydraulically.

A variety of braking systems have been developed over a number of years for use on bicycles with many of these braking systems being mechanical in nature. A common type of braking system for bicycles is the hand operated caliper brake which is movable to engage the sides of the bicycle wheel. The handle to operate this brake can be mounted adjacent the hand grip on the handlebar and the brakes themselves can be connected to the frame structure adjacent the wheel rim. With such brakes, it is common to provide a first braking system to brake the front wheel and a separate but similar braking system to brake the rear wheel. When operating such brakes, it is important that the rear brake be operated prior to or at the same time as the front brake in order to avoid a possibly dangerous braking situation or flipping of the bicycle.

It is also known in this art to provide hydraulically operated braking systems. For example, U.S. Pat. No. 3,993,174 issued Nov. 23, 1976 to Lynn A. Williams et al. describes caliper type bicycle brakes for the front and rear wheels wherein the two brakes are actuated simultaneously by a single actuator assembly mounted adjacent the handlebars. Hydraulic fluid under pressure is delivered to the brakes by two self-contained hydraulic circuits, one for the front brake and one for the rear brake. According to the patent specification, this known brake system has the capability of applying a greater braking force at the front wheel than at the rear wheel. According to the inventors named in the patent specification, their testing has determined that for good braking results, the ratio of braking force should be such that a greater portion of the braking force is applied to the front wheel, contrary to some previous understanding.

More recent U.S. Pat. No. 5,632,362 issued May 27, 1997, teaches a hydraulic operated disc brake for a bicycle. The main unit for this brake system includes a master cylinder, a reservoir housing, and a brake piston housing. This system uses a compensating piston mounted within the reservoir chamber and cooperating with this chamber to define a compensating chamber. This system also includes a master piston shaft with a master piston mounted thereon. The brake piston is reciprocally mounted within the braking piston chamber and the master piston shaft is movable from a braking position to a release position.

A non-hydraulic brake system for a bicycle is taught in U.S. Pat. No. 4,102,439 to Calderazzo. In this unique system, there is a rear wheel brake which can be operated by standard mechanical means including the use of a Bowden cable that extends down from a hand lever mounted on the handlebars. The rear wheel braking torque is the means of actuating the front brakes. Substantial force-amplification characterizes the actuating connection between a rear-wheel torque-reaction pick off and the front brake actuation. The rear wheel braking torque is noted by physical displacement against a spring so that if front wheel brake torque becomes so effective as to substantially reduce rear-wheel brake torque, the spring will automatically react to reduce the magnitude of front brake effort. Although this known braking system has some merit, it appears to suffer from the disadvantages of being relatively complex and therefore relatively expensive to produce and maintain.

It is an object of the present invention to provide an improved hydraulic braking system for a bicycle wherein the operation of the rear brake by the bicycle operator automatically results in an appropriate application of the front brake mechanism as well.

It is a further object of the present invention to provide a hydraulic brake system which is relatively inexpensive to manufacture and install on a bicycle and which is quite easy for a bicycle rider to operate.

SUMMARY OF THE INVENTION

According to one aspect of the invention, a bicycle brake system for a bicycle having a frame structure and front and rear wheels includes a rear wheel brake mechanism mountable on the frame structure adjacent the rear wheel, this braking mechanism including a rear wheel braking device for applying a braking force to the rear wheel when the braking device is moved to a rear wheel braking position. The brake system further includes a hydraulic cylinder device mountable on the frame structure adjacent the rear wheel and connected to the rear wheel braking mechanism so as to be actuated thereby when said rear wheel braking device is moved to the rear wheel braking position. There is also a front hydraulic actuator mountable on the frame structure adjacent the front wheel and operatively connected to the hydraulic cylinder device so as to be moved to a front wheel braking position by fluid provided by movement of the hydraulic cylinder device when the hydraulic cylinder device is actuated. A front wheel braking device is connected to the front hydraulic actuator and movable thereby between a non-braking position and a front wheel braking position. During use of the braking system on a bicycle, the front wheel braking device brakes the front wheel when the rear wheel braking device is in the rear wheel braking position and is applying a braking force to the rear wheel. The braking system is constructed to provide a substantially greater braking force on the front wheel compared to the braking force on the rear wheel during all braking conditions of the brake system.

Preferably, the rear wheel braking mechanism includes a hydraulic master cylinder device mountable on the handlebar of the bicycle and a hydraulic cylinder actuator mountable on the frame adjacent the rear wheel and operably connected to the master cylinder device so as to be movable by hydraulic pressure to the rear wheel braking position.

According to another aspect of the present invention, a hydraulic braking system for a bicycle having a frame and a handlebar includes a master hydraulic cylinder mountable on the handlebar of the bicycle and a handle mechanism operably connected to master hydraulic cylinder in order to actuate the master hydraulic cylinder. There is also a first hydraulic cylinder actuator mountable on the frame adjacent said rear wheel and operatively connected to the master hydraulic cylinder so as to be actuated thereby. A rear wheel braking device is connected to the first hydraulic cylinder actuator and operable thereby during use of the brake system. This rear wheel braking device is moved between a disengaged position and a rear wheel braking position. The system further includes a second hydraulic cylinder actuator mountable on the frame adjacent the rear wheel and connected to the rear wheel braking device so as to be operable thereby. This second hydraulic cylinder actuator is movable from an initial position corresponding to the disengaged position of the rear wheel braking device to a secondary position when the rear wheel braking device is in the rear wheel braking position. A third hydraulic cylinder actuator is mountable on the frame adjacent the front wheel and is operably connected to the second hydraulic cylinder actuator so as to be actuated thereby. A front wheel braking device is connected to the third hydraulic cylinder actuator and is operable thereby during use of the brake system. This front wheel braking device is movable between a disengaged position and a front wheel braking position. During use of this brake system, the front wheel braking device brakes a front wheel when the rear wheel braking device is in the rear wheel braking position.

Preferably, the rear wheel braking device includes a rear brake pad and is connected to an outer end of a piston rod which extends from one end of the first hydraulic cylinder actuator. Also the preferred front wheel braking system device includes a front brake pad and is connected to an outer end of another piston rod which extends from one end of the third hydraulic cylinder actuator.

According to a further aspect of the invention, there is provided a brake system in combination with a bicycle having a frame, front and rear wheels rotatably mounted on the frame, and a pivotable handlebar for steering. The braking system of this combination includes a primary brake actuator mounted on the handlebar and including a handle mechanism for manually operating the brake system. There is also a rear wheel braking mechanism including a first hydraulic cylinder actuator mounted on the frame adjacent the rear wheel and operatively connected to the primary brake actuator so as to be actuated by the primary brake actuator during use of the brake system. The rear wheel braking mechanism includes a rear brake pad movable between a disengaged position and a rear wheel braking position. The first hydraulic cylinder actuator includes a piston rod which extends from one end of the cylinder actuator and has an outer end connected to the rear brake pad. The system further includes a hydraulic cylinder device mounted on the frame adjacent the rear wheel and connected to the rear wheel braking mechanism so as to be operated thereby. This device is movable from an initial position corresponding to the disengaged position of the rear wheel braking mechanism to a secondary position when the rear wheel braking mechanism is in the rear wheel braking position. The hydraulic cylinder device extends at a substantial angle of more than 45 degrees to a longitudinal central axis of the first hydraulic cylinder actuator. A front hydraulic cylinder actuator mounted on the frame adjacent the front wheel is operatively connected to the hydraulic cylinder device so as to be actuated by movement of this device from its initial position to the secondary position. A front wheel braking device is connected to the front hydraulic cylinder actuator and is operable thereby during use of the brake system. This front wheel braking device is movable by the front hydraulic cylinder actuator between a non-braking position and a front wheel braking position. In operation of the system, the front wheel braking device brakes the front wheel when the rear wheel braking mechanism is in the rear wheel braking position.

Preferably the front wheel braking device is a front brake pad arranged to engage an outer circumferential surface of a tire of the front wheel.

Further features and advantages of this system will become apparent from the following detailed description of a preferred embodiment taken in conjunction with the accompanying drawings.

DETAILED DESCRIPTION OF PREFERRED EMBODIMENT

Figure 1:
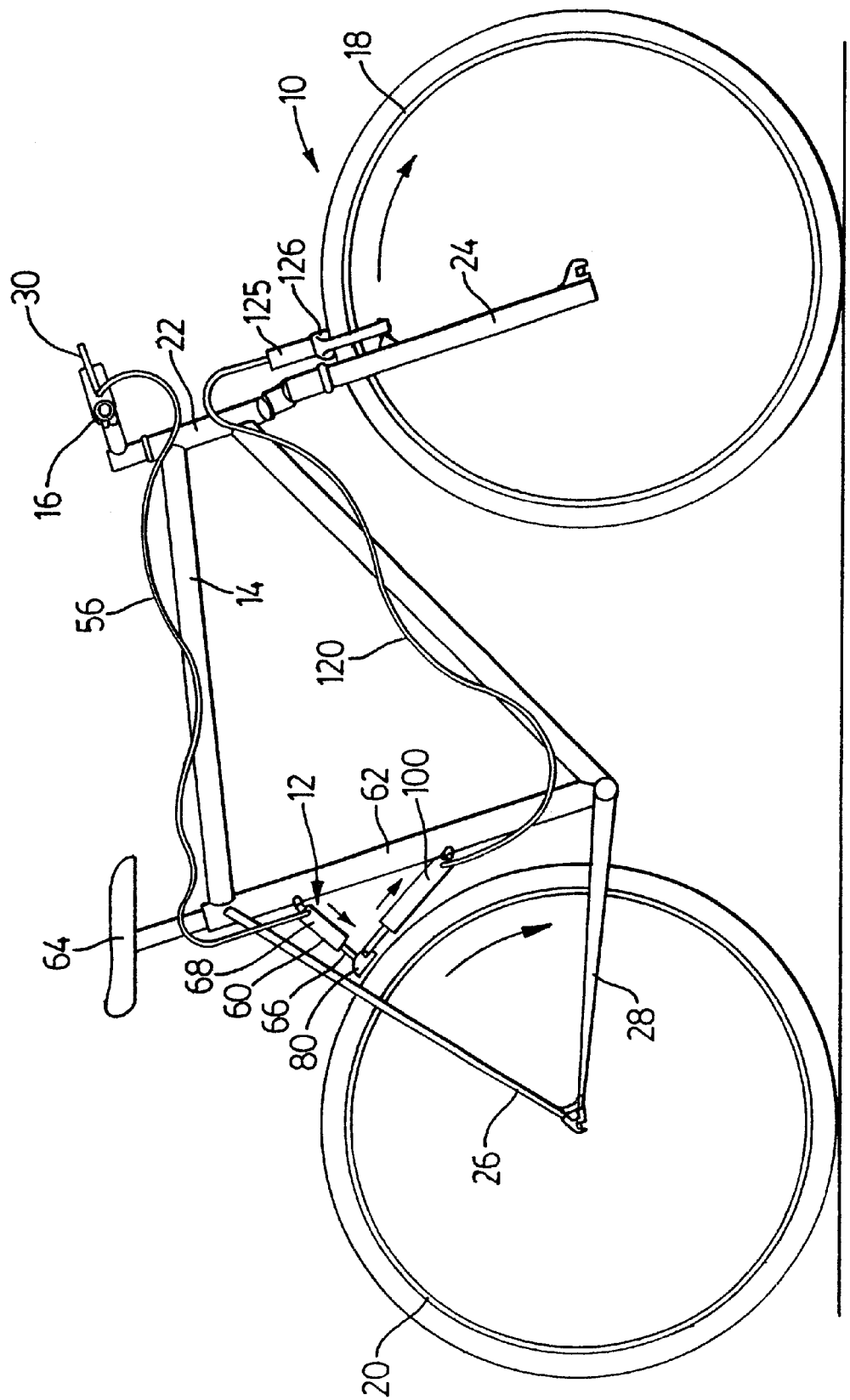
FIG. 1 is a side elevation of a bicycle equipped with a preferred embodiment of a hydraulic brake system constructed in accordance with the invention.

FIG. 1 illustrates a conventional bicycle 10 that has been equipped with a hydraulic brake system in accordance with a preferred version of the present invention, this system identified generally by 12. The bicycle has a standard rigid frame 14, the major sections of which are generally tubular frame members, a handlebar 16 which is pivotably mounted on the frame, a front wheel 18, and a rear wheel 20. Arranged at the front end of the frame is a tubular bearing 22 that extends generally vertically. In the tubular bearing a steering column to which the handlebar 16 is rigidly attached is mounted. Connected to the bottom of this steering column is a standard front fork 24 and the front wheel is rotatably mounted to and between the two legs of this fork. The rear wheel 20 is conventionally mounted between two rear wheel extensions of the bicycle frame structure. Each rear wheel extension includes an upwardly and forwardly sloping frame member 26 and a substantially horizontal frame member 28. It will be understood that driving torque can be provided to the rear wheel 20 using a conventional pedal-operated sprocket and chain drive which is not shown in the drawings for ease of illustration. As the pedal drive system is of standard construction, a description thereof is deemed unnecessary.

As indicated, the present invention relates to the novel brake system 12 that can be used on the described, standard two wheel bicycle.

Figure 2:
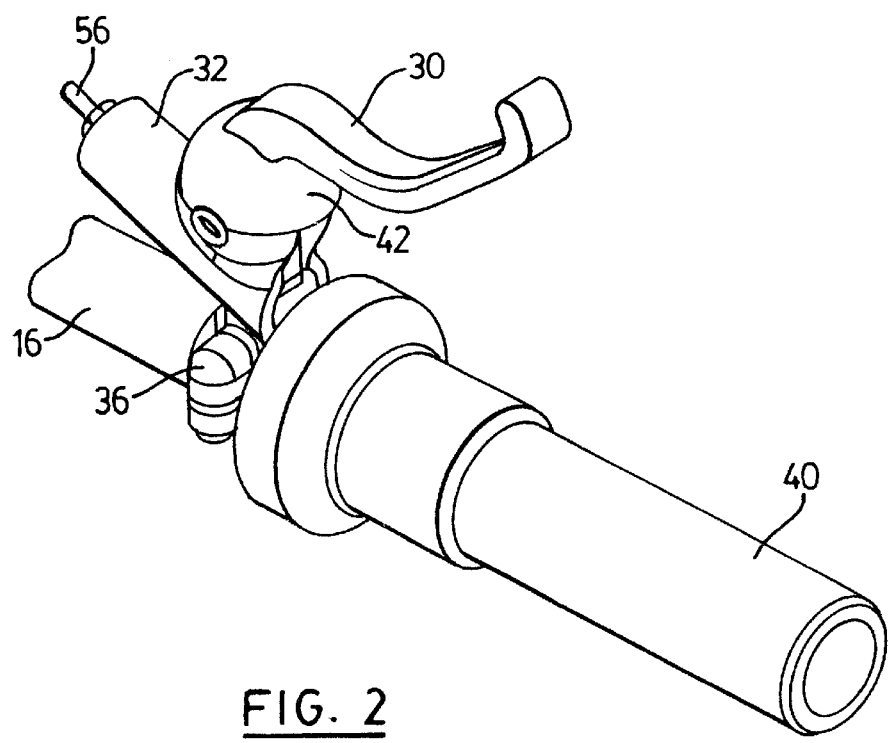
FIG. 2 is a detailed view in perspective illustrating a hand lever mechanism for operating the brake system and a portion of the handlebar of the bicycle.
Figure 3:
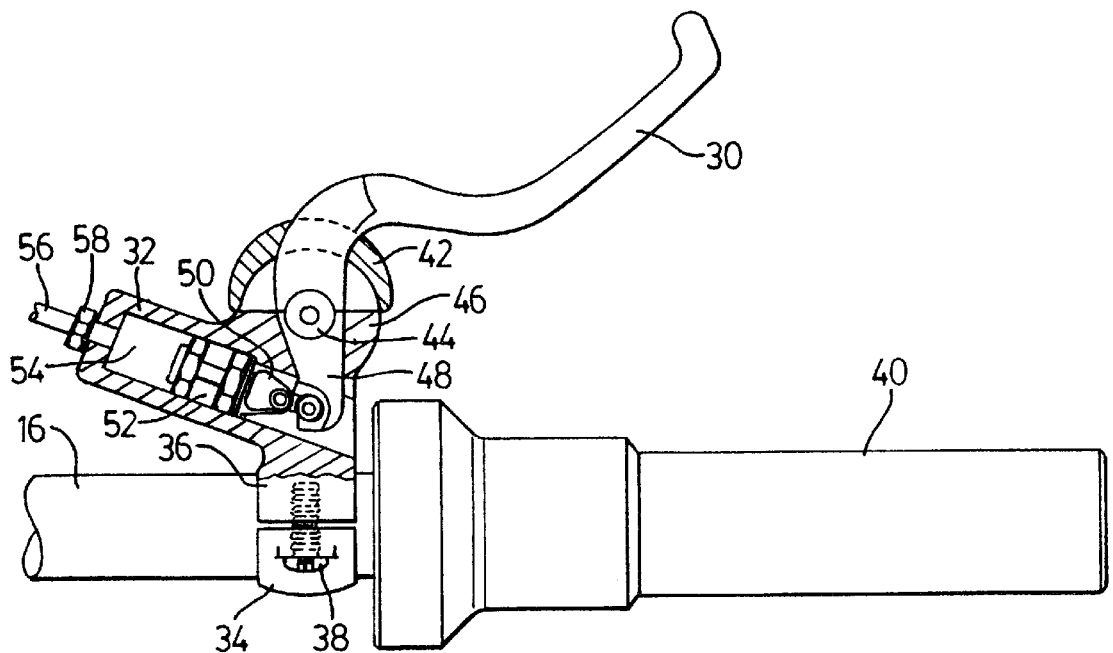
FIG. 3 is a top view, partly in cross-section illustrating the handle mechanism and a master cylinder operated thereby together with a portion of the handlebar of the bicycle.

Some main, preferred components of the present hydraulic brake system will know be described with initial reference to FIGS. 1 to 3 of the drawings. This system 12 includes a handle mechanism 30 which includes a hand lever that can be operated by several fingers of the bicycle rider's hand. This handle mechanism is operatively connected to a master hydraulic cylinder 32 which is mountable on the handlebar 16 along with the handle mechanism. The handle mechanism and master cylinder are detachable connected to the handlebar 16 by means of a two part clamp including U shaped clamp member 34 and main clamp section 36 which forms a base on which the master cylinder is mounted. Two bolts 38 can extend through aligned holes in the clamp member 34 and in clamp portion 36 to join them together. It will be understood that the handle mechanism 30 is mounted usually close to the handle grip 40 which is mounted on an end section of the handlebar.

The illustrated hand lever is formed with a handle end section 42 and the hand lever is able to pivot about a pivot pin 44 which is mounted in lever support 46. The handle mechanism includes a short operating arm 48 pivotably connected to a connecting link 50 which in turn is connected to a piston 52. A pivotable movement of the hand level causes the piston 52 to move in a corresponding manner in a cylindrical chamber 54 formed in the master cylinder. This chamber is filled with hydraulic fluid or brake fluid which is able to exit and enter the chamber through the brake line or hose 56, only the end section of which is shown in FIGS. 2 and 3. A standard hydraulic line connector 58 detachably joins the end of the brake line to one end of the master cylinder. One suitable type of handle mechanism/master cylinder combination that can be used in this invention is that sold under the trade mark Shimano Decore XT. This particular device operates with mineral oil as the hydraulic fluid. Mineral oil has the advantage of being non-toxic compared to standard brake fluids.

The brake system further includes a hydraulic cylinder actuator 60, sometimes herein referred to as the first hydraulic cylinder actuator, which can be mounted on the frame 14 adjacent the rear wheel 20. As shown in FIG. 1, this actuator is mounted on the rear side of upwardly extending frame tube 62 on the top of which a seat 64 is mounted. This first hydraulic cylinder actuator 60 is operatively connected to the master hydraulic cylinder 32 by means of the elongate, flexible brake hose or brake line 56. Thus the actuator 60 can be actuated or moved by the master hydraulic cylinder. The first actuator 60 can be of standard construction for a linear, hydraulic cylinder actuator and can include a piston rod 66 as well as the hydraulic cylinder member 68. Further details of a preferred version of the first actuator 60 can be seen in FIG. 4. The closed or uppermost end of the cylinder member is provided with a pin support or lug 70 having a hole for a pivot pin 72. The pin 72 connects the upper end of the hydraulic cylinder to a clamping device 74 which is detachably mounted on the frame tube 62 of the bicycle. The clamping device can include two bolts 76 which, in a known manner, can extend through holes formed in two generally U-shaped halves of the clamping device.

Figure 4:
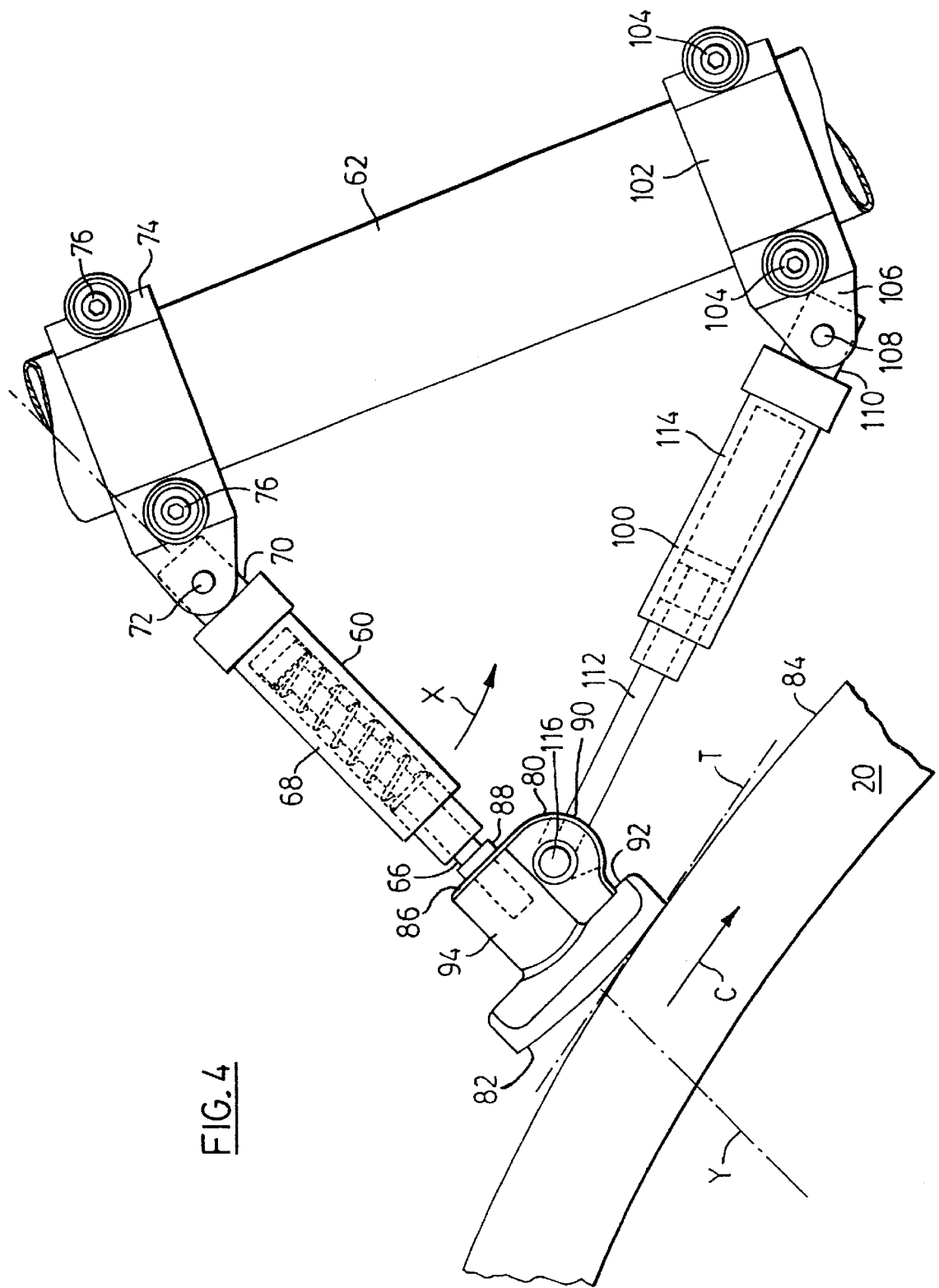
FIG. 4 is a side elevation showing details of the rear wheel braking mechanism together with a hydraulic cylinder device connected thereto.

The outer end of the piston rod 66 can be threaded so as to permit a threaded connection to a rear wheel braking device 80. The braking device is connected to the first hydraulic cylinder actuator and is operable thereby during use of the brake system. It will be understood that the rear wheel braking device is movable between a disengaged position wherein its braking surface or brake pad 82 is a short distance away from the tire of the rear wheel to a rear wheel braking position which is shown in FIG. 4. The preferred rear wheel braking device includes a rear brake pad 82. Alhough a standard bicycle brake pad or block can be used, a preferred form of pad is made of aluminum impregnated with silicon carbide particles which is a metal matrix composite. This preferred brake pad is extremely hard and wear resistant and, with this type of brake pad, it will last the life of the bicycle without requiring adjustment or replacement. As shown in FIG. 4, the brake pad is arranged in the preferred embodiment to engage an outer circumferential surface 84 of the rear wheel tire and it should engage the circumferential surface at a small acute angle to the tangential line indicated at T in FIG. 4. It will be seen that as the braking force is applied by the rear brake pad, the first hydraulic cylinder actuator 60 will tend to pivot in a counter clockwise direction indicated by the arrow X in FIG. 4. As shown in FIG. 4, it will also be understood that the rear wheel is turning in the clockwise direction indicated by the arrow C.

Returning to the rear wheel braking device 80, the illustrated device includes a connecting top wall 86 to which is connected an internally threaded sleeve or nut member 88 which is threaded on the piston rod. Top wall 86 extends forwardly to a curved front section 90 which extends down to brake pad support 92. The braking device can also include one or preferably two side walls 94 that are joined to the top wall and to the front section.

The present brake system also include a second hydraulic cylinder actuator 100 which can also be termed a "booster cylinder" in the preferred system. This second hydraulic cylinder actuator is mountable on the frame tube 62 as well by means of a further clamping device 102 which can be similar to the clamping device 74 in its construction. This clamping device also has two connecting bolts 104. A connecting lug or ear 106 on one side of the clamping device is used to support a pivot pin 108 that pivotably connects the second actuator 100 to the clamping device 102. The second actuator is also formed with a connecting lug 110 at its closed end and through this lug the pin 108 extends.

With respect to the second hydraulic cylinder actuator 100 itself, this device can be constructed in the manner of a standard linear hydraulic actuator and it includes a rearwardly extending piston rod 112 and hydraulic cylinder 114. This cylinder contains hydraulic fluid, such as non-toxic mineral oil, or brake fluid and movement of this fluid into and out of the chamber of the cylinder results from inward or outward movement of the piston rod 112. As shown in FIG. 4, the second hydraulic cylinder actuator is mountable on the bicycle frame adjacent the rear wheel 20 and it is connected to the rear wheel braking device by means of a pivot pin connector located at 116. In this way, it will be seen that pivotable movement of the first actuator 60 and of the rear wheel braking device effectively operates and moves the second hydraulic cylinder actuator. The second actuator 100 is movable from its initial position (not shown) which corresponds to the disengaged position of the rear wheel braking device to a secondary position (shown in FIG. 4) when the rear wheel braking device is in the rear wheel braking position. As shown in FIG. 1, a second elongate brake hose or brake line 120 is connected to the closed forward end of the hydraulic cylinder 114 and thus, when hydraulic pressure is created by inward movement of the piston rod 112 the hydraulic fluid will pass out of the hydraulic cylinder and into the line or hose 120.

Connected to the brake hose is another hydraulic cylinder actuator 125, sometimes referred to herein as the third hydraulic cylinder actuator. To this actuator is connected a front wheel braking device 126 as shown in detail in FIGS. 5 and 6. The front wheel braking device is operable by means of the third actuator 125 thereby during use of the brake system. The third hydraulic cylinder actuator, which can be of standard construction, is mounted on the bicycle frame 14 adjacent the front wheel 18 and, as indicated, it is operatively connected to the second hydraulic cylinder actuator 100 by the brake line 120 so as to be actuated by the second actuator 100. It will also be understood that the front wheel braking device 126, which preferably includes a front brake pad or block 128, is moved in the direction indicated by the arrow Z in FIGS. 5 and 6 between a disengaged position shown in FIG. 5 (where the brake pad is a short distance away from the circumferential surface of front tire 130) and a front wheel braking position which is a position shown in FIG. 6. In a preferred embodiment of the actuator 125, the brake pad 128 is lowered or engaged upon application of hydraulic pressure to the top of the piston in the cylinder. A coil spring in the actuator can be used to retract the brake pad upon release of the hydraulic pressure. It will also be seen that the front wheel braking device brakes the front wheel during use of the brake system when the rear wheel braking device is in the rear wheel braking position.

Figure 5:
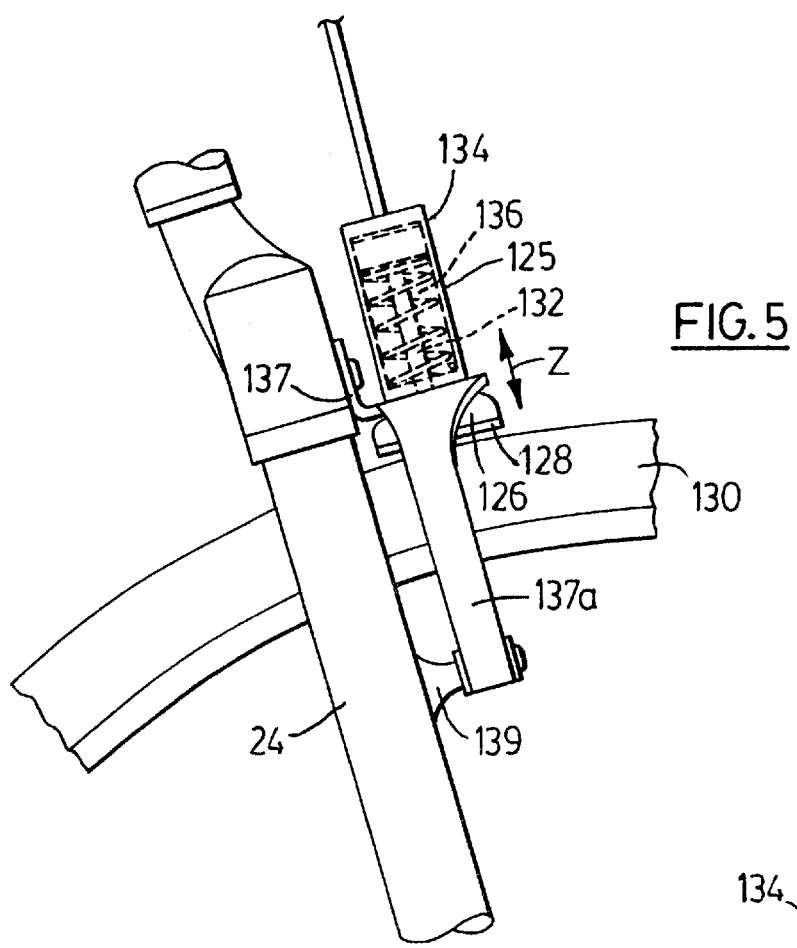
FIG. 5 is a side elevation showing details of the front wheel braking device and a hydraulic cylinder actuator for operating same.
Figure 6:
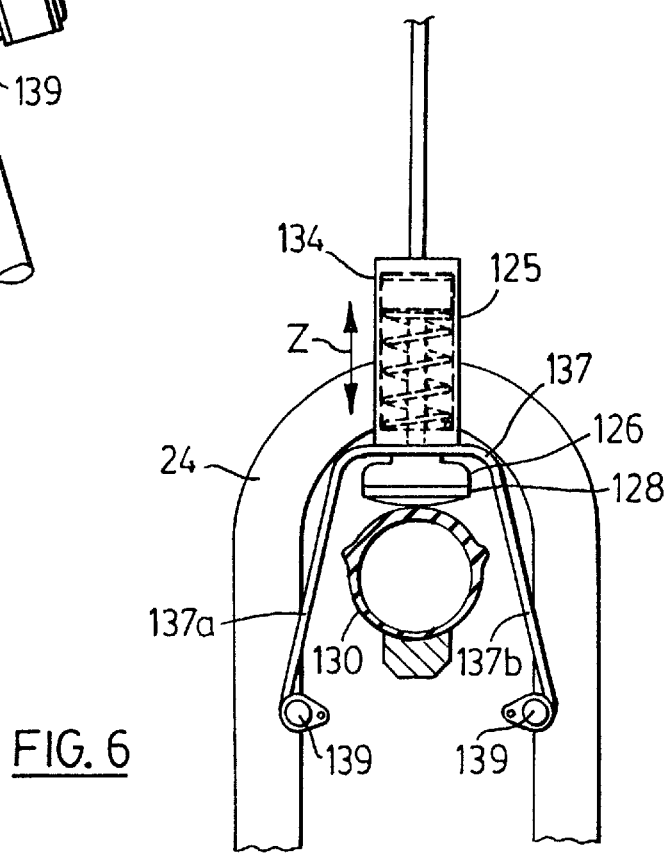
FIG. 6 is a front side view of the front wheel braking device with its hydraulic cylinder actuator with the adjacent section of the front wheel shown in transverse cross-section.

The preferred construction of the front wheel braking device and its actuator can be seen from FIGS. 5 and 6. The front brake pad 128 is preferably made from the same material as the rear brake pad, in particular aluminum impregnated with silicon carbide particles. The pad is connected so as to be movable in a generally vertical direction to an outer end of piston rod 132 which is shown in dash line in FIGS. 5 and 6. This piston rod extends from a lower end of the third hydraulic cylinder actuator which includes hydraulic cylinder 134 forming a hydraulic fluid chamber 136 into which the piston rod extends. The hydraulic cylinder 134 can be attached on its rear side at 138 by a bracket 137 or other suitable connector to the top of the front fork 24. In this way the front brake mechanism pivots with the front fork and maintains its position directly above the front wheel. To strengthen the support for this braking device, the illustrated preferred bracket has two downward extensions 137a and 137b which are joined by short connectors 139 to the front fork members on both sides of the front wheel.

As can be seen from FIGS. 1 and 4, in the preferred embodiment, second hydraulic cylinder actuator 100 extends at a substantial angle of more than 45 degrees and preferably more than 60 degrees to a longitudinal central axis of the first hydraulic cylinder actuator 60. This longitudinal axis is indicated at Y in FIG. 4. This substantial angle to the axis Y can be as much as approximately 90 degrees as illustrated in FIG. 1 but preferably does not exceed 90 degrees.

The preferred hydraulic brake system of the present invention is constructed and set up so as to provide a substantially greater braking force on the front wheel 18 compared to the braking force on the rear wheel during all operating conditions of the brake system. In a particular preferred embodiment, the braking force between the two wheels is divided so that there is about 80% braking force applied to the front wheel and the remaining 20% is applied to the rear wheel and the 80/20 ratio remains about the same regardless of the intensity of pressure or squeeze on the hand lever of the handle mechanism 30. Those skilled in the construction of hydraulic systems, will understand and appreciate how this ratio can be established using well known hydraulic engineering techniques. Briefly, the required ratio or brake proportioning can be achieved through a difference in the surface area of the piston in the actuator 100 versus the surface area of the piston in the actuator 125 for the front wheel brake. Thus in order to achieve the preferred ratio of 80/20, the surface area of the piston in the actuator 125 can be made four times greater than the surface area of the piston in the actuator 100.

Although the 80/20 ratio for the braking force between the front wheel and the rear wheel is preferred, it will be readily apparent that a smaller ratio is also possible and it is in fact possible to construct the present brake system so that the braking force on the front wheel is approximately equal to the braking force on the rear wheel or is only slightly greater than the braking force on the rear wheel. However, in a preferred embodiment of the present brake system, it is believed that the braking force on the front wheel should be made at least 60% of the total braking force applied to both the front and rear wheels of the bicycle during use of the braking system. Accordingly it is believed that an acceptable range for the braking force on the front wheel is between 60% and 80% of the total braking force.

Figure 7:
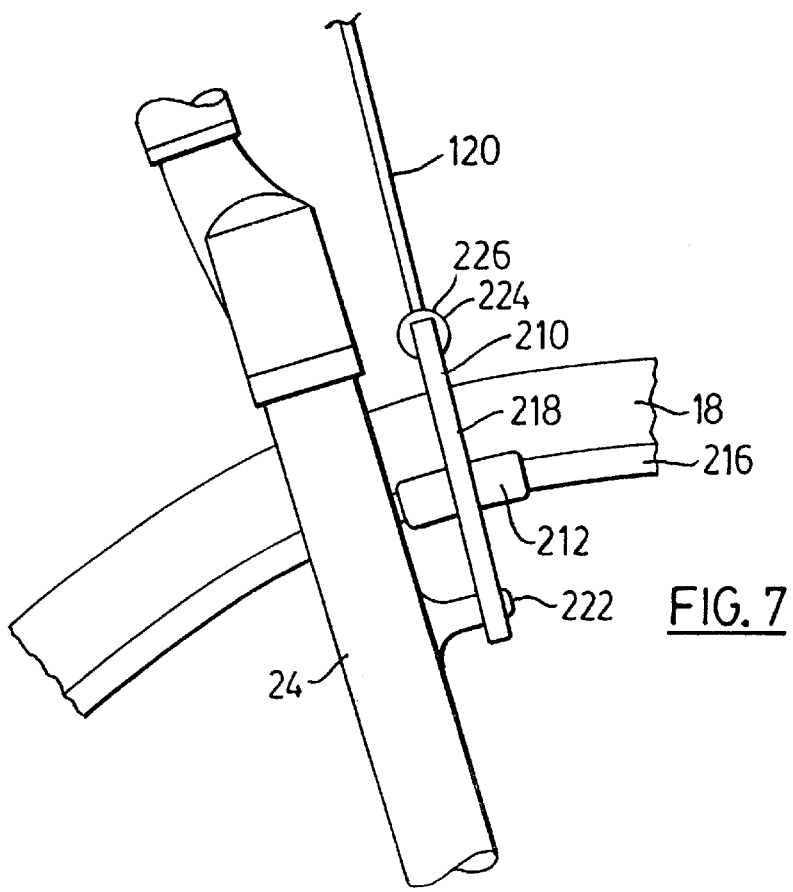
FIG. 7 is a side elevation showing details of an alternative form of front wheel braking device and its hydraulic cylinder actuator.
Figure 8:
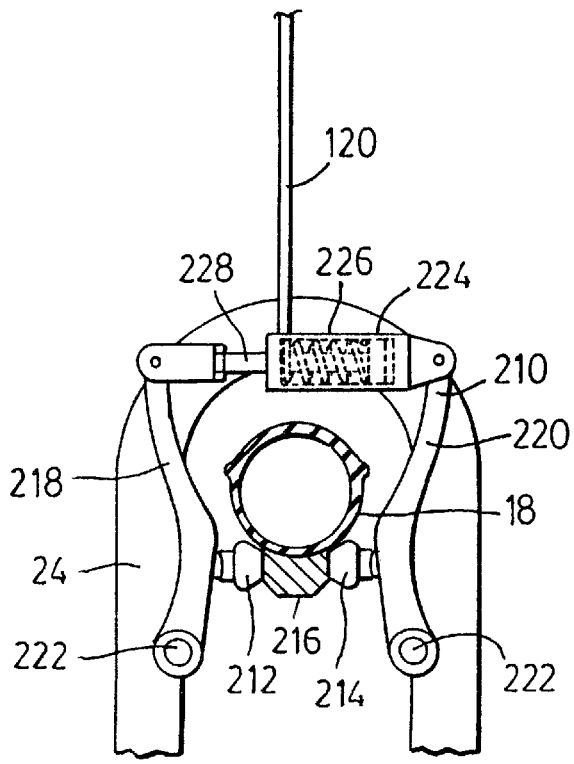
FIG. 8 is a front side view of the front wheel braking device of FIG. 7 and its hydraulic cylinder actuator with the adjacent section of the front wheel shown in transverse cross-section.

FIGS. 7 and 8 illustrate an alternate form for the braking device used for the front wheel 18. It will be understood that apart from the front wheel braking device, the braking system is constructed in the same manner as illustrated in FIG. 1 of the drawings. The front wheel braking device is indicated generally by reference 210. This particular braking device employs two opposing brake pads 212 and 214 which can be of standard construction. These brake pads are arranged to engage the sides of the front wheel rim 216. The brake pads are mounted on respective, pivotable caliper arms 218, 220. Each of these arms is mounted on a pivot pin or stud 222 which is mounted on a respective arm of front fork 24. Pivotably connected to the tops of the caliper arms is a suitable hydraulic actuator which per se can be of standard construction. As shown in the drawings, the central axis of this actuator extends generally horizontally. This actuator includes a small hydraulic cylinder 226 from which extends a small piston rod 228. It will be understood that the inner end of the piston rod is connected to a piston that is slidable in the cylinder. When hydraulic fluid is forced through the hydraulic line 120 and into one end of the cylinder, this will cause the length of the hydraulic actuator 224 to be reduced. This in turn will bring the brake pads 212, 214 into contact with the wheel rim and thereby cause a braking action on the front wheel. When there is no hydraulic pressure on the hydraulic fluid, a suitable spring in the hydraulic actuator will cause the length of the actuator 224 to increase, thereby disengaging the brake pads from the wheel rim.

Figure 9:
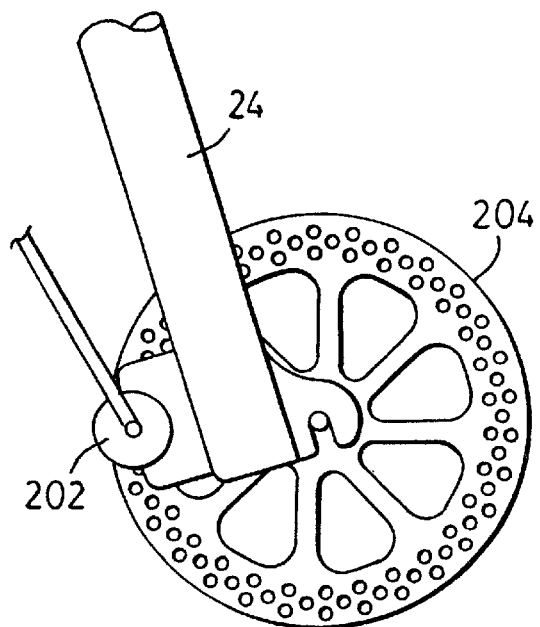
FIG. 9 is a side elevational detail view showing another form of front wheel braking device and a hydraulic cylinder actuator for this braking device.
Figure 10:
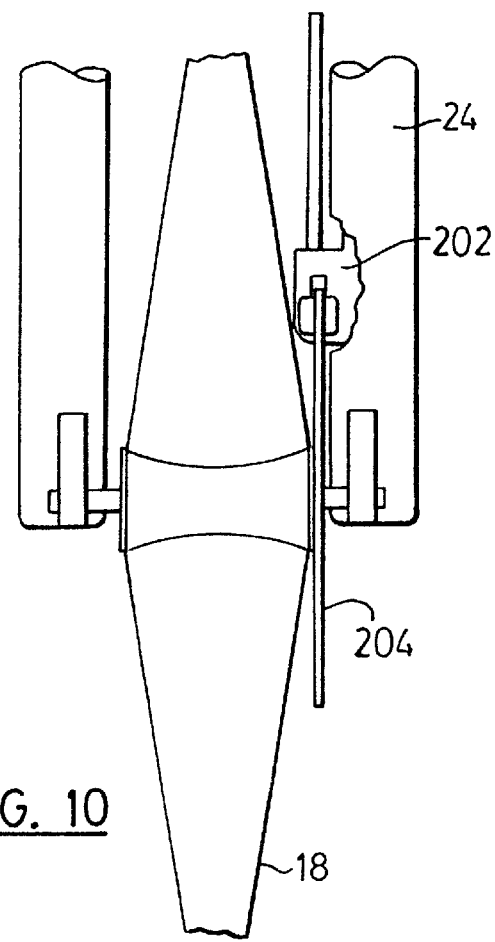
FIG. 10 is a top detail view illustrating the front wheel braking device and actuator of FIG. 9, this view having a portion of one support frame broken away for illustration purposes.

FIGS. 9 and 10 illustrate an alternate form of brake system that can also be made for a bicycle and is in accordance with the invention. Except for the differences noted hereinafter, it will be understood that this alternative form of brake system is constructed in the same manner as the above described brake system illustrated in FIGS. 1 to 4. This system can also be made with the handle mechanism 30 and the master hydraulic cylinder 32 illustrated in detail in FIGS. 2 and 3. Also the rear wheel braking system can be constructed in the same manner as in the bicycle in FIG. 1. The principal difference is the braking device used for the front wheel 18. In the braking device of FIGS. 9 and 10, there is a front hydraulic caliper brake 202 which is adapted to releasably engage a front brake disc 204 mounted on the front wheel 18 of the bicycle, only a central portion of which is shown in FIG. 10. It will be understood that the application of hydraulic pressure by means of hydraulic fluid to the front hydraulic caliper brake will cause this brake to engage both sides of the front brake disc 204 and thereby exert a braking action on the front wheel. Hydraulic caliper and disk brakes are well known per se in the bicycle brake art and are commonly available. Therefore a detailed description herein is deemed unnecessary. Reference can be made, for example to recent U.S. Pat. No. 5,950,772 which issued Sep. 14, 1999 to Hayes Brake, Inc. which describes and illustrates in detail a hydraulically operated caliper brake system for a bicycle. The disclosure and drawings of this recent US patent are incorporated herein by reference.

In the brake system of FIGS. 9 and 10, the caliper brake is mounted on the front fork 24 of the bicycle and is arranged as to straddle the brake disk 204. There is a first movable brake pad mounted on one side of the caliper and a second movable brake pad mounted on the other side. The hydraulic brake actuator mechanism engages both movable brake pads equally and, when actuated, the flexible brake disc is engaged on both sides by the brake pads. Again, it will be appreciated that the system can be set up so as to provide much greater braking force to the front brake disc 204 than the braking force applied to the tire of the rear wheel, From the above description and explanation of the preferred versions of the hydraulic brake system of this invention, it will be seen that this brake system has a number of advantages compared to the standard, known bicycle brakes that generally employ two caliper type brakes, one for each wheel. Unlike the known braking systems which employ two caliper type brakes and two hand levers to operate same, only one hand lever needs to be operated with the system of the present invention in order to brake both the front and rear wheels and, with the preferred braking system, the braking action can be divided in a desirable manner between the front and rear wheels regardless of the amount of the pressure being applied to the hand lever. For example, in a particularly preferred embodiment of this invention, the braking action can be divided so as to be 80% applied to the front wheel with 20% applied to the rear wheel.

Also the known mechanical type of caliper brakes are very sensitive to water due to the fact that the co-efficient of friction with the usual combination of brake blocks or brake pads and wheel materials can fall substantially when wet and they can, for example, fall to only one tenth of the co-efficient of friction when these materials are dry. On the other hand, with the brake system of the present invention, the brakes can be much more effective in wet weather because much more pressure can be applied by means of the front brake pad through the booster hydraulic cylinder system.

A further advantage is that the commonly used brake cables for known brakes are subject to wear and corrosion and therefore they must be replaced periodically. The hydraulic brake lines used in the preferred brake system of the invention are substantially more immune to wear and corrosion than the aforementioned brake cables.

Another problem with the known rim brakes is that when using these brakes to a substantial extent, the brakes can cause the temperature of the wheel rim to rise quickly so that it can reach a point at which rubber cement holding tire patches, or even the tire itself, softens and this can cause the tire to deflate or even come off the wheel rim with possible serious consequences. With the above described preferred brake system shown in FIGS. 1 and 4, extensive use of the front and rear brakes will not affect the temperature of the wheel rims because the brake pads engage with the tires directly and not the rims.

Yet another problem with the known mechanical caliper brakes arises from the fact that the brake blocks or pads will wear the rear rims down so that the rim themselves must be replaced periodically. Again, because the present brake system does not employ brake pads that engage at least the rear wheel rims, the rear wheel rims of the bicycle at least should last substantially longer.

It will be apparent to those skilled in the art of bicycle brakes that various modifications and changes can be made to the described brake system of this invention without departing from the spirit and scope of this invention. Accordingly, all such modifications and changes as fall within the scope of the appended claims are intended to be part of this invention.

I claim:

1. A hydraulic brake system for a bicycle having a frame, a handlebar, and front and rear wheels, the brake system having:

a master hydraulic cylinder mountable on said handlebar of the bicycle;

a handle mechanism operatively connected to said master hydraulic cylinder in order to actuate said master hydraulic cylinder;

a first hydraulic cylinder actuator mountable on said frame adjacent said rear wheel and operatively connected to said master hydraulic cylinder so as to be actuated by said master hydraulic cylinder, said first hydraulic cylinder actuator including a piston rod which extends from one end of said hydraulic cylinder actuator and has an outer end;

a rear wheel braking device connected to said first hydraulic cylinder actuator and operable thereby during use of said brake system, said rear wheel braking device comprising a rear brake pad movable between a disengaged position and a rear wheel braking position, said rear wheel braking device being connected to said outer end of the piston rod;

a second hydraulic cylinder actuator mountable on said frame adjacent said rear wheel and connected to said rear wheel braking device so as to be operable thereby, said second hydraulic cylinder actuator being movable from an initial position corresponding to said disengaged position of the rear wheel braking device to a secondary position when said rear wheel braking device is in said rear wheel braking position and said second hydraulic cylinder actuator extending at a substantial angle of more than 45 degrees to a longitudinal central axis of said first hydraulic cylinder actuator when said brake system is mounted on a bicycle;

a third hydraulic cylinder actuator mountable on said frame adjacent said front wheel and operatively connected to said second hydraulic cylinder actuator so as to be actuated by said second hydraulic cylinder actuator; and a front wheel braking device connected to said third hydraulic cylinder actuator and operable thereby during use of said brake system, said front wheel braking device being movable between a disengaged position and a front wheel braking position, wherein said front wheel braking device brakes said front wheel during use of said brake system when said rear wheel braking device is in said rear wheel braking position.

2. A hydraulic brake system according to claim 1 wherein said rear brake pad is constructed of aluminum impregnated with silicon carbide particles and is adapted to engage an outer circumferential surface of a tire, which is part of said rear wheel.

3. A hydraulic brake system according to claim 1 wherein said front wheel braking device includes a front brake pad and is connected to an outer end of another piston rod which extends from one end of said third hydraulic cylinder actuator.

4. A hydraulic brake system according to claim 1 wherein said first hydraulic cylinder actuator is operatively connected to said master hydraulic cylinder by a first elongate, flexible brake hose.

5. A hydraulic brake system according to claim 4 wherein said third hydraulic cylinder actuator is operatively and directly connected to said second hydraulic cylinder actuator by a second elongate, flexible brake hose.

6. A hydraulic brake system according to claim 1 wherein said second hydraulic cylinder actuator has a piston rod extending from one end thereof and said rear wheel braking device is pivotably connected to an outer end of said piston rod of the second hydraulic cylinder actuator.

7. A hydraulic brake system according to claim 1 wherein said front wheel braking device is a front caliper-type brake adapted to releasably engage a front brake disc mounted on said front wheel of the bicycle.

8. A brake system in combination with a bicycle having a frame, front and rear wheels rotatably mounted on said frame and a pivotable handlebar for steering, said brake system comprising:

a primary brake actuator mounted on said handlebar, said brake actuator including a handle mechanism for manually operating said brake system;

a rear wheel braking mechanism including a first hydraulic cylinder actuator mounted on said frame adjacent said rear wheel and operatively connected to said primary brake actuator so as to be actuated by said primary brake actuator during use of said brake system, said rear wheel braking mechanism also including a rear brake pad movable between a disengaged position and a rear wheel braking position, said first hydraulic cylinder actuator including a piston rod which extends from one end of said hydraulic cylinder actuator and has an outer end connected to said rear brake pad;

a hydraulic cylinder device mounted on said frame adjacent said rear wheel and connected to said rear wheel braking mechanism so as to be operated thereby, said hydraulic cylinder device being movable from an initial position corresponding to said disengaged position of the rear wheel braking mechanism to a secondary position when said rear wheel braking mechanism is in said rear wheel braking position, said hydraulic cylinder device extending at a substantial angle of more than 45 degrees to a longitudinal central axis of said first hydraulic cylinder actuator;

a front hydraulic cylinder actuator mounted on said frame adjacent said front wheel and operatively connected to said hydraulic cylinder device so as to be actuated by movement of said hydraulic cylinder device from said initial position to said secondary position; and a front wheel braking device connected to said front hydraulic cylinder actuator and operable thereby during use of said brake system, said front wheel braking device being movable by said front hydraulic cylinder actuator between a non-braking position and a front wheel braking position, wherein said front wheel braking device brakes said front wheel when said rear wheel braking mechanism is in said rear wheel braking.

9. A brake system and bicycle combination according to claim 8 wherein said front wheel braking device is a front brake pad arranged to engage an outer circumferential surface of a tire of said front wheel.

10. A brake system in combination with a bicycle having a frame, front and rear wheels rotatably mounted on said frame and a pivotable handlebar for steering, said brake system comprising:

a primary brake actuator mounted on said handlebar, said brake actuator including a handle mechanism for manually operating said brake system;

a rear wheel braking mechanism mounted on said frame adjacent said rear wheel and operatively connected to said primary brake actuator so as to be actuated by said primary brake actuator during use of said brake system, said rear wheel braking mechanism including a rear brake pad and a rear brake hydraulic cylinder actuator connected to said rear brake paid and being movable between a disengaged position and a rear wheel braking position, said rear brake pad engaging an outer circumferential surface of a tire forming part of said rear wheel in said rear wheel braking position;

a hydraulic cylinder device mounted on said frame adjacent said rear wheel and connected to said rear wheel braking mechanism so as to be operated thereby, said hydraulic cylinder device being movable from an initial position corresponding to said disengaged position of the rear wheel braking mechanism to a secondary position when said rear wheel braking mechanism is in said rear wheel braking position;

a front hydraulic cylinder actuator mounted on said frame adjacent said front wheel and operatively connected to said hydraulic cylinder device so as to be actuated by movement of said hydraulic cylinder device from said initial position to said secondary position; and a front wheel braking device connected to said front hydraulic cylinder actuator and operable thereby during use of said brake system, said front wheel braking device being movable by said front hydraulic cylinder actuator between a non-braking position and a front wheel braking position, wherein said front wheel braking device brakes said front wheel when said rear wheel braking mechanism is in said rear wheel braking position.

11. A brake system and bicycle combination according to claim 10 wherein said primary brake actuator is a hydraulic master cylinder which is connected to said rear wheel braking mechanism by an elongate, flexible brake line carrying a liquid suitable for hydraulic use in the brake system.

12. A brake system and bicycle combination according to claim 11 wherein said brake system is constructed to provide a substantially greater braking force on said front wheel compared to the braking force on said rear wheel during all operating conditions of the brake system.

13. A bicycle brake system for a bicycle having a frame structure and front and rear wheels, said system comprising:

a hydraulic master cylinder device mountable on a handlebar of said bicycle;

a rear wheel braking mechanism including a hydraulic cylinder actuator mountable on said frame structure adjacent said rear wheel and operatively connected to said master cylinder so as to be movable by hydraulic pressure to a rear wheel braking position, said braking mechanism including a rear wheel braking device connected to one end of said hydraulic cylinder actuator for applying a braking force to said rear wheel when said braking device is moved to said rear wheel braking position;

a hydraulic cylinder device mountable on said frame structure adjacent said rear wheel and connected to said rear wheel braking mechanism so as to be actuated thereby when said rear wheel braking device is moved to said rear wheel braking position;

a front hydraulic actuator mountable on said frame structure adjacent said front wheel and operatively connected to said hydraulic cylinder device so as to be moved to a front wheel braking position by fluid provided by movement of said hydraulic cylinder device when said hydraulic cylinder device is actuated; and a front wheel braking device connected to said front hydraulic actuator and movable thereby between a non-braking position and the front wheel braking position, wherein, during use of said brake system on a bicycle said front wheel braking device brakes said front wheel when said rear wheel braking device is in said rear wheel braking position and is applying a braking force to the rear wheel and said brake system is constructed to provide a substantially greater braking force on said front wheel compared to the braking force on said rear wheel during all braking conditions of the brake system.

14. A bicycle brake system according to claim 13 wherein said rear wheel braking device is a brake pad device arranged so as to be movable into engagement with a tire of said rear wheel when said rear wheel braking device is in said rear wheel braking position.

15. A bicycle brake system according to claim 14 wherein said front wheel braking device is a front brake pad device adapted for movement into engagement with a tire of said front wheel.

16. A bicycle brake system according to claim 14 wherein said brake pad device has a brake pad made of aluminum impregnated with silicon carbide.

17. A bicycle brake system according to claim 13 wherein said rear wheel braking mechanism includes a hand lever connected to said master cylinder device and adapted to operate same.

18. A bicycle brake system according to claim 13 wherein said brake system is constructed to provide a braking force on said front wheel which is at least 75% of the total braking force applied to both front and rear wheels of the bicycle during use of the brake system.

19. A hydraulic brake system for a bicycle having a frame, a handlebar, and front and rear wheels, the brake system having:

a master hydraulic cylinder mountable on said handlebar of the bicycle;

a handle mechanism operatively connected to said master hydraulic cylinder in order to actuate said master hydraulic cylinder;

a first hydraulic cylinder actuator mountable on said frame adjacent said rear wheel and operatively connected to said master hydraulic cylinder so as to be actuated by said master hydraulic cylinder;

a rear wheel braking device connected to said first hydraulic cylinder actuator and operable thereby during use of said brake system, said rear wheel braking device being movable between a disengaged position and a rear wheel braking position;

a second hydraulic cylinder actuator mountable on said frame adjacent said rear wheel and connected to said rear wheel braking device so as to be operable thereby, said second hydraulic cylinder actuator being movable from an initial position corresponding to said disengaged position of the rear wheel braking device to a secondary position when said rear wheel braking device is in said rear wheel braking position;

a third hydraulic cylinder actuator mountable on said frame adjacent said front wheel and operatively connected to said second hydraulic cylinder actuator so as to be actuated by said second hydraulic cylinder actuator; and a front wheel braking device connected to said third hydraulic cylinder actuator and operable thereby during use of said brake system, said front wheel braking device being movable between a disengaged position and a front wheel braking position, wherein said front wheel braking device brakes said front wheel during use of said brake system when said rear wheel braking device is in said rear wheel braking position and said brake system is constructed to provide a substantially greater braking force on said front wheel compared to the braking force on said rear wheel during all braking conditions of the brake system.

20. A hydraulic brake system according to claim 19 wherein said rear wheel braking device includes a rear brake pad and is connected to an outer end of a piston rod which extends from one end of said first hydraulic cylinder actuator.

21. A hydraulic brake system according to claim 20 wherein said front wheel braking device includes a front brake pad and is connected to an outer end of another piston rod which extends from one end of said third hydraulic cylinder actuator.

22. A hydraulic brake system according to claim 20 wherein said third hydraulic cylinder actuator is operatively and directly connected to said second hydraulic cylinder actuator by an elongate, flexible brake hose.

23. A hydraulic brake system according to claim 20 wherein said second hydraulic cylinder actuator has a piston rod extending from one end thereof and said rear wheel braking device is pivotably connected to an outer end of said piston rod of the second hydraulic cylinder actuator.

\* \* \* \* \*